United States Patent
Edwards et al.

(10) Patent No.: US 6,363,116 B1
(45) Date of Patent: Mar. 26, 2002

(54) PICTURE QUALITY ASSESSMENT USING SPATIAL LOCATION WITH OR WITHOUT SUBSAMPLING

(75) Inventors: John W. Edwards, Lake Oswego; Steven D. Maurer, Aloha, both of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/122,615

(22) Filed: Jul. 25, 1998

Related U.S. Application Data

(63) Continuation-in-part of application No. 08/826,648, filed on Apr. 4, 1997, now abandoned.

(51) Int. Cl.[7] .............................................. H04N 07/18
(52) U.S. Cl. .............................. 375/240.21; 375/240.26
(58) Field of Search .................................. 348/172, 188, 348/190; 375/240.26, 240.21

(56) References Cited

U.S. PATENT DOCUMENTS

| | | | |
|---|---|---|---|
| 5,214,508 A | 5/1993 | Stevens | |
| 5,313,280 A | 5/1994 | Straus | |
| 5,329,379 A | 7/1994 | Rodriquez et al. | |
| 5,446,492 A | 8/1995 | Wolf et al. | |
| 5,499,050 A | 3/1996 | Baldes et al. | |
| 5,654,751 A | * 8/1997 | Richard, III | 348/192 |
| 5,818,520 A | 10/1998 | Janko et al. | |
| 6,057,882 A | * 5/2000 | Lambrecht et al. | 348/192 |

FOREIGN PATENT DOCUMENTS

WO    WO 95/31869    11/1995

OTHER PUBLICATIONS

Objective Quality Assessment of Digitally Transmitted Video, IEEE pacific Rim Conference on Communications, May 9–10, 1991.

* cited by examiner

*Primary Examiner*—Andy Rao
(74) *Attorney, Agent, or Firm*—Francis I. Gray

(57) ABSTRACT

A picture quality assessment method based upon spatial location with or without subsampling within the picture divides the video picture into a plurality of arbitrarily sized, geometric segments. A segment weighting map is generated that provides one value for "safe picture" segments of the video picture and another value for the other segments. Optionally one or more of the segments may be subsampled to reduce processing time for realtime applications. The video picture on a segment basis is compared with a corresponding test video picture using a picture quality assessment algorithm to generate a quality error value for each segment. The quality error values are weighted according to the segment weighting map, and on an error display the weighted quality error values are displayed.

4 Claims, 3 Drawing Sheets

FIG.2

| 4 | 3 | 3 | 4 |
|---|---|---|---|
| 3 | 1 | 1 | 3 |
| 3 | 1 | 1 | 3 |
| 3 | 4 | 4 | 3 |

FIG.3

| 4 | 1 | 3 | 1.5 |
|---|---|---|-----|
| 2 | 2 | 0.5 | 0.1 |
| 1 | 1 | 3 | 0.7 |
| 0.4 | 6 | 5 | 2 |

FIG.4

| 4 | 0 | 3 | 0 |
|---|---|---|---|
| 0 | 2 | 0 | 0 |
| 0 | 1 | 3 | 0 |
| 0 | 6 | 5 | 0 |

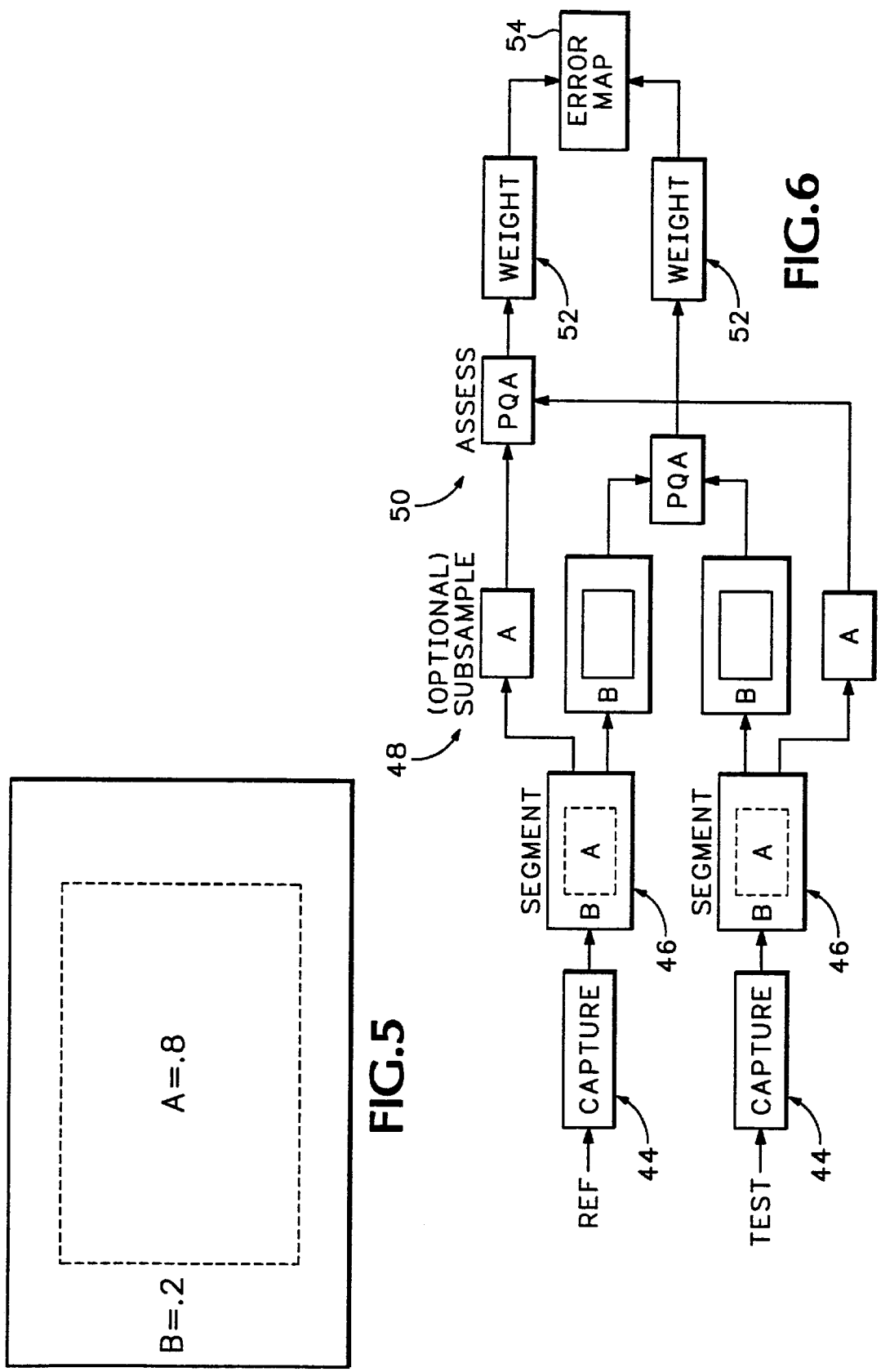

PICTURE QUALITY ASSESSMENT USING SPATIAL LOCATION WITH OR WITHOUT SUBSAMPLING

CROSS-REFERENCE TO RELATED APPLICATIONS

This is a continuation-in-part of U.S. patent application Ser. No. 08/826,648 filed Apr. 4, 1997, now abandoned.

STATEMENT REGARDING FEDERALLY SPONSORED RESEARCH OR DEVELOPMENT

Not applicable

BACKGROUND OF THE INVENTION

The present invention relates to the test and measurement of video image signals, and more particularly to video picture quality assessment using spatial location with or without subsampling.

Both subjective and objective measurements of video quality degradation in video image signals have been done. In subjective measurements human subjects visually compare and rate the degradation between an original and an impaired video image signal. Objective quality measurements are done by comparing an impaired video image signal to its original video image signal. The comparison includes such processing as transforming video image signals into bit-map form, adjusting mutual amplitude gain, offset and spatial shift, filtering them in some fashion, subtracting them from each other, then filtering some more and representing the results either as error maps or as statistics derived from these maps.

Subjective measurement methods suffer from a lack of reproducibility and consistency. Objective methods are mechanistic and lack the ability to differentiate between areas where human observers pay attention ("attentional factors") and those areas without much interest to humans.

U.S. Pat. No. 5,940,124, filed Jul. 17, 1997 by Bozidar Janko and John Edwards entitled "Attentional Maps in Objective Measurement of Video Quality Degradation", addresses content-based picture quality by describing a method of isolating a particular content element, such as a human face, and applying a greater quality weighting to such element. However this method requires either a manual input as to which elements in the picture should be weighted more or a special processing algorithm that makes such a determination for every picture.

It is well known that certain portions of a video picture are more likely to carry important information than others. The video industry uses a so-called "safe picture" and "safe title" area inside which the important elements of a program are generally captured by a camera and in which titles are contained. Essentially the safe areas define the central portion of the screen, i.e., the periphery of the video image is outside the safe area. Also presently measurement of picture quality is a compute intensive operation that cannot be performed in real time. For certain applications, such as satellite transmission where it is desired to compress the various channels as much as possible without appreciable degradation so that the satellite may carry more channels, realtime processing is desireable.

What is desired is a simpler method of picture quality assessment using spatial location with or without subsampling rather than attentional maps.

BRIEF SUMMARY OF THE INVENTION

Accordingly the present inventions provides picture quality assessment using spatial location with or without subsampling. A video sequence, either a reference or from a device under test, is divided into a plurality of arbitrarily sized, geometric segments. A segment weighting map is generated that provides a low threshold for "safe picture" segments of the video picture and a high threshold for other segments. Weighting coefficients may be used instead of thresholds. Optionally one or more of the segments may be subsampled to reduce the amount of processing required for realtime applications at the expense of measurement accuracy. The video picture, both reference and test, is captured, segmented, optionally subsampled and processed by an appropriate picture quality assessment algorithm, such as JND or PSNR for example, to generate a quality error value for each segment. The segment weighting map is applied to each segment, and the result is displayed as an error map.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 2 is a segment weighting map for picture quality assessment according to the present invention having threshold levels.

FIG. 3 is a diagram of measured quality errors for each segment of the segment weighting map of FIG. 2.

FIG. 4 is an error display using the segment weighting map of FIG. 2 for the measured quality errors of FIG. 3.

FIG. 5 is a segment weighting map for picture quality assessment according to the present invention having weighting coefficients.

FIG. 6 is a flow diagram view for picture quality assessment according to the present invention.

DETAILED DESCRIPTION OF THE INVENTION

Figure 1:
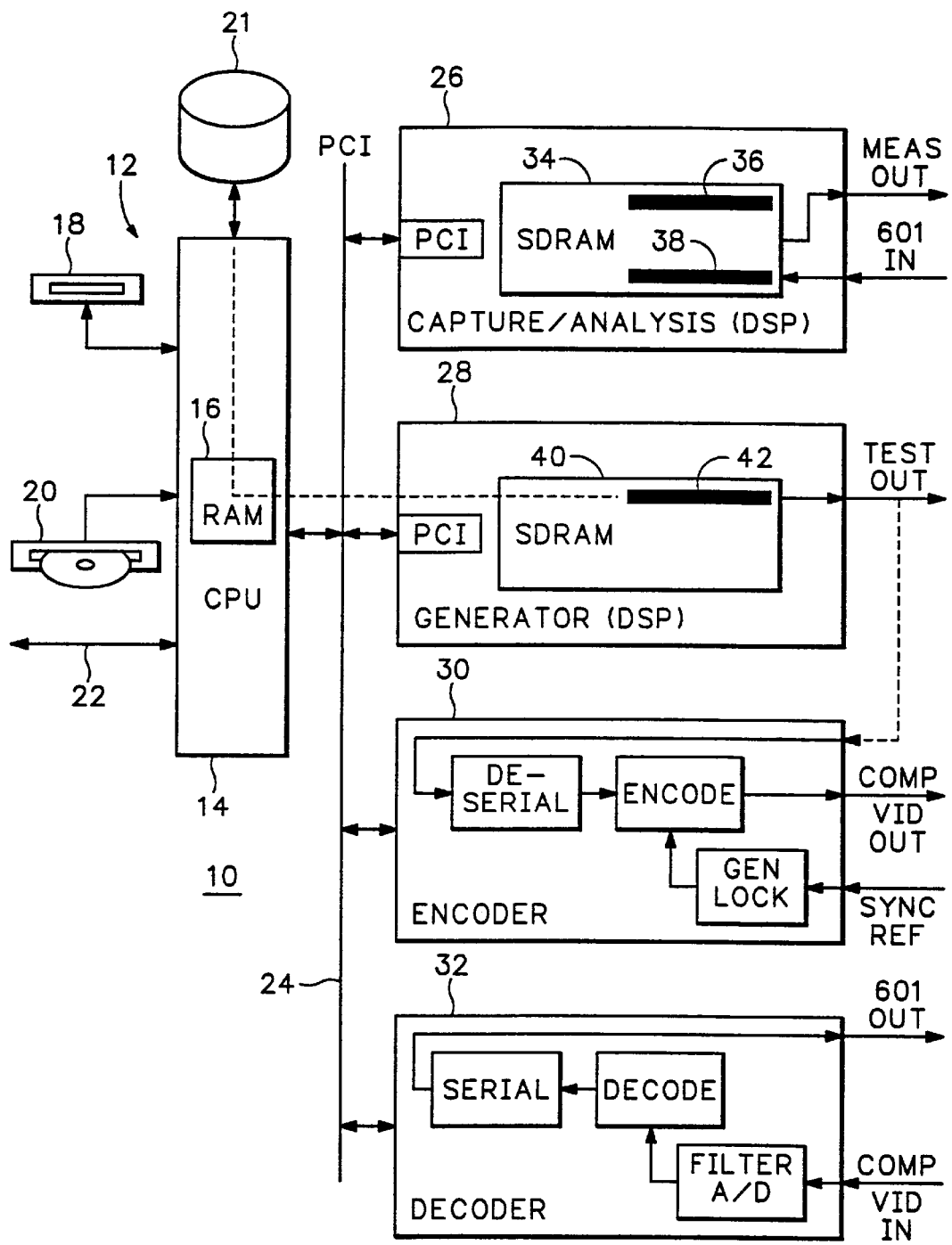
FIG. 1 is a block diagram view of a test and measurement instrument for performing picture quality assessment according to the present invention.

Referring now to FIG. 1 a test and measurement instrument 10 is shown based upon a personal computer interface (PCI) architecture. A personal computer (PC) 12 has a central processing unit (CPU) 14 that includes a random access memory 16. The PC 12 typically includes a floppy disc drive 18, a CD-ROM drive 20, a hard disc drive 21 and an interface port 22 to which, for example, a mouse, a keyboard, a printer and the like may be coupled. The PC 12 is coupled to a PCI bus 24 to which other PCI compatible plug-in cards may be coupled. For the present instrument 10 a digital signal processing (DSP) board may be plugged into the PCI bus 24, which board includes a capture/analysis section 26 and an optional generator section 28. Also coupled to the PCI bus 24 may be an encoder 30 for converting serial digital video to composite video and/or a decoder 32 for converting composite video to serial digital video.

The DSP board includes in the capture/analysis section 26 a random access memory (SDRAM) 34 that contains a test sequence file 36 and a capture sequence file 38. The generator section 28 also includes an SDRAM 40 that contains a generated test sequence file 42. In operation a test sequence may either be captured from a source and stored in the test sequence file 36 or may be generated from the generated test sequence file 42. A video image sequence corresponding to the video test sequence that is received from a system under test to which the video test sequence is input is captured and stored in the capture sequence file. The DSP then compares the test and capture files according to the desired measurement, such as just noticable difference (JND) or power signal to noise ratio (PSNR) measurements or other picture quality assessment (PQA) algorithm. The resulting measurements are provided as an output for display.

The generated video test sequence may be input to the encoder 30 to produce a composite video signal for display on an appropriate monitor.

As shown in FIG. 2 each video image may be broken up into a plurality of geometric segments. For convenience rectangular segments are shown. The segments form a matrix of rectangles with arbitrary horizontal and vertical dimensions. A picture quality metric is computed for each segment using a picture quality assessment measure. A quality metric threshold, or weight, is assigned for each segment, so that for example the center segments receive a low error threshold value (high weight), such as 1, while those around the periphery receive greater error threshold values (low weight), to form a segment weighting map. The error values generated by the comparison of the test sequence file with the capture sequence file are compared with the corresponding threshold values defined by the segment weighting map. As an example some segment error values are shown in FIG. 3. Where the error value is less than the threshold in the segment weighting map, the resulting section in an error display is shown as having zero errors, as shown in FIG. 4. If the error value is equal to or greater than the threshold, then the error value is provided on the display for each segment. A segment weighting map with weighting coefficients is shown alternatively in FIG. 5.

Although rectangular segments are described for ease of explanation, any arbitrarily sized, geometric picture segment may be used and arbitrarily located on the image. The threshold weighting described above is applied to such segments. The picture quality assessment measures alternatively may be multiplied by the weights indicated prior to applying the threshold values or in lieu of the threshold values.

To decrease processing time for realtime applications, the individual segments optionally may separately or collectively be subsampled before being input to the picture quality assessment algorithm (for both the reference and test segments). Subsampling is defined as intentionally discarding pixels and/or lines in a set pattern from the original image or segment. Any pattern may be used. For example, a simplistic 4:1 subsample scheme may be organized by discarding every other pixel and every other line. By providing both weighting after the PQA algorithm and subsampling before the PQA algorithm on a segment by segment basis, an operator may tune for the best balance between them for greatest accuracy while achieving realtime results. Subsampling achieves a similar, but different, effect as weighting, acting more like a reduction of viewing angle—moving back from the viewing screen. This presents a significant savings to the computation of the appropriate picture quality measure at a cost of being significantly more inaccurate when the subsample ratio gets too high.

The total process is shown in FIG. 6. The reference video sequence and test video sequence from the device under test are both captured in step 44 and stored in their respective files 36, 38. For this example two segments are shown, interior segment A which might correspond to an SDTV portion of an HDTV video sequence and surrounding segment B. The video sequences are segmented at step 46. In this example only segment A is optionally segmented at step 48. In step 50 the desired PQA algorithim is applied to each segment, and in step 52 the segment weighting map is applied to the PQA measures. The resulting error values for each segment are combined for display into the error display map at step 54.

Thus the present invention provides picture quality assessment by dividing the video picture into arbitrary geometric segments, optionally subsampling each segment, finding the quality error for each segment, and comparing the error with a segment weighting map where specified segments have a low threshold value (high weight) and the other segments have a higher threshold value (low weight) to produce an error display.

What is claimed is:

1. A method of assessing video picture quality comprising the steps of:

dividing a video picture into a plurality of arbitrarily sized geometric segments;

generating a segment weighting map having a specified quality metric threshold for each segment;

comparing each segment of the video picture with a corresponding segment of a test video picture to produce for each segment a quality error value; and displaying the quality error value for each segment where the quality value equals or exceeds the specified quality metric threshold from the segment weighting map.

2. The method as recited in claim 1 further comprising the step of selectively subsampling one or more of the arbitrarily sized, geometric segments for the video picture and corresponding test video picture prior to the comparing step.

3. A method of assessing video picture quality comprising the steps of:

capturing a reference video sequence and a corresponding output video sequence from a device under test;

dividing the reference video sequence and output video sequence into a plurality of corresponding arbitrarily sized, geometric segments;

generating a segment weighting map having a specified value for each geometric segment;

comparing the reference video sequence with the output video sequence on a segment by segment basis using a picture quality assessment algorithm to produce a quality error value for each geometric segment;

weighting each quality error value according to the segment weighting map to produce weighted quality error values; and displaying the weighted quality error values on an error display map for each geometric segment.

4. The method as recited in claim 3 further comprising the step of selectively subsampling one or more of the corresponding arbitrarily sized, geometric segments from the reference video sequence and the output video sequence prior to the comparing step.

* * * * *